US011241818B2

(12) United States Patent
Suzuki et al.

(10) Patent No.: US 11,241,818 B2
(45) Date of Patent: Feb. 8, 2022

(54) PIPE-SHAPED INTEGRALLY MOLDED ARTICLE AND PRODUCTION METHOD FOR PIPE-SHAPED INTEGRALLY MOLDED ARTICLE

(71) Applicant: TORAY INDUSTRIES, INC., Tokyo (JP)

(72) Inventors: Yuki Suzuki, Nagoya (JP); Rei Sato, Nagoya (JP); Kazuya Okubo, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 128 days.

(21) Appl. No.: 16/635,095

(22) PCT Filed: Jan. 10, 2019

(86) PCT No.: PCT/JP2019/000440
§ 371 (c)(1),
(2) Date: Jan. 29, 2020

(87) PCT Pub. No.: WO2019/139061
PCT Pub. Date: Jul. 18, 2019

(65) Prior Publication Data
US 2020/0247028 A1    Aug. 6, 2020

(30) Foreign Application Priority Data

Jan. 15, 2018 (JP) .............................. JP2018-004060
Nov. 7, 2018 (JP) .............................. JP2018-209595

(51) Int. Cl.
*B29C 49/04* (2006.01)
*B29C 48/625* (2019.01)
(Continued)

(52) U.S. Cl.
CPC ............ *B29C 49/04* (2013.01); *B29C 48/625* (2019.02); *B29C 48/40* (2019.02); *B29C 49/0005* (2013.01);
(Continued)

(58) Field of Classification Search
CPC ......... B29C 49/04; B29C 49/48; B29C 49/64; F16L 9/12
(Continued)

(56) References Cited

U.S. PATENT DOCUMENTS 6,759,003 B1 *   7/2004   Obara ................. B29C 49/4817
                                                           264/529
8,512,839 B2 *   8/2013   Yung .................... B29C 49/0005
                                                           428/36.9
(Continued)

FOREIGN PATENT DOCUMENTS

JP          5-104613 A           4/1993
JP          5-230372 A           9/1993
(Continued)

OTHER PUBLICATIONS

International Search Report, issued in PCT/JP2019/000440, PCT/ISA/210, dated Apr. 2, 2019.
(Continued)

*Primary Examiner* — Patrick F Brinson
(74) *Attorney, Agent, or Firm* — Birch, Stewart, Kolasch & Birch, LLP

(57) ABSTRACT

Provided are: a pipe-shaped integrally molded article which is formed by molding a polyphenylene sulfide resin composition, and which has, at one or more portions thereof, at least one selected from different-shape sections, bent sections, and different-diameter sections, the pipe-shaped integrally molded article being characterized in that the total length L (mm) thereof is 1000 or more, and the ratio (L/D) of the total length L (mm) to the outer diameter D (mm) of the pipe-shaped integrally molded article is 20 or more: and a production method for the pipe-shaped integrally molded article. According to the present invention, it is possible to efficiently provide a pipe-shaped integrally molded article having a desired large length and including a three-dimen-
(Continued)

sionally complicated shape, by using a PPS resin composition having excellent heat resistance and chemical resistance.

6 Claims, 7 Drawing Sheets

(51) Int. Cl.
  *B29C 48/40* (2019.01)
  *B29C 49/00* (2006.01)
  *B29K 81/00* (2006.01)
  *B29K 309/08* (2006.01)
(52) U.S. Cl.
  CPC ...... *B29K 2081/04* (2013.01); *B29K 2309/08* (2013.01); *B32B 2262/101* (2013.01); *B32B 2307/306* (2013.01); *B32B 2307/558* (2013.01); *B32B 2597/00* (2013.01)
(58) Field of Classification Search
  USPC ................................. 138/177; 428/36.9, 35.7
  See application file for complete search history.

(56) References Cited

U.S. PATENT DOCUMENTS

| | | | |
|---|---|---|---|
| 2003/0077411 A1 | 4/2003 | Hibino et al. | |
| 2005/0119358 A1* | 6/2005 | Tatematsu | B29C 44/3469 521/50 |
| 2008/0038499 A1 | 2/2008 | Ono et al. | |
| 2010/0307627 A1 | 12/2010 | Nezu et al. | |
| 2011/0210482 A1* | 9/2011 | Sakamoto | F24D 3/12 264/531 |
| 2013/0327437 A1* | 12/2013 | Feng | F02M 35/10131 138/177 |
| 2014/0183774 A1* | 7/2014 | Ezure | B29C 43/02 264/50 |
| 2019/0330470 A1 | 10/2019 | Yamanaka et al. | |
| 2019/0367730 A1* | 12/2019 | Yoshida | C08L 81/02 |

FOREIGN PATENT DOCUMENTS

| | | |
|---|---|---|
| JP | 6-316008 A | 11/1994 |
| JP | 7-195497 A | 8/1995 |
| JP | 11-228827 A | 8/1999 |
| JP | 11-287363 A | 10/1999 |
| JP | 2003-25415 A | 1/2003 |
| JP | 2003-127256 A | 5/2003 |
| JP | 2003-305768 A | 10/2003 |
| JP | 2004-69022 A | 3/2004 |
| JP | 2008-38099 A | 2/2008 |
| JP | 2009-178967 A | 8/2009 |
| JP | 2015-218850 A | 12/2015 |
| WO | WO 2018/003700 A1 | 1/2018 |

OTHER PUBLICATIONS

Written Opinion of the International Searching Authority, issued in PCT/JP2019/000440, PCT/ISA/237, dated Apr. 2, 2019.

* cited by examiner

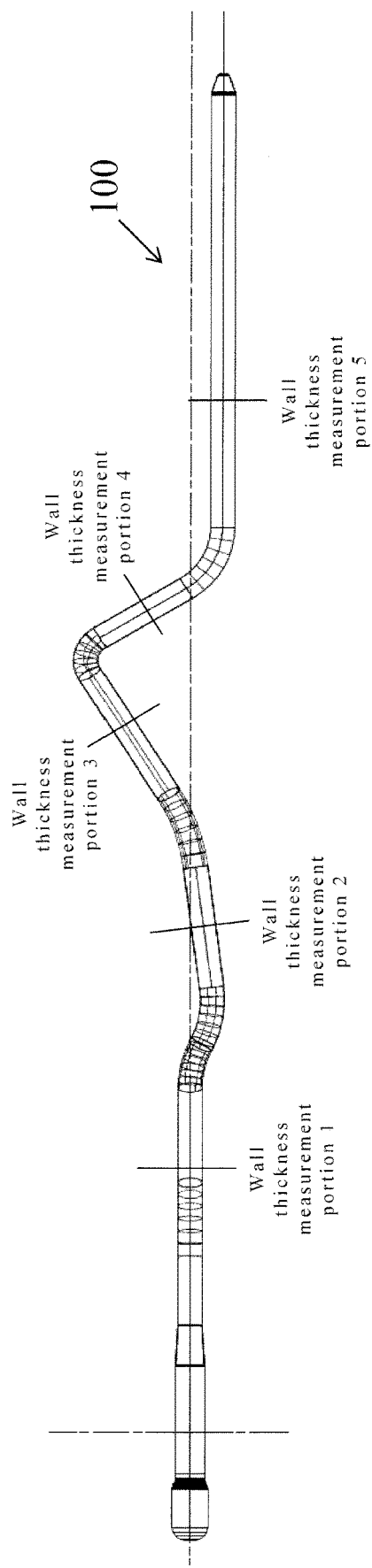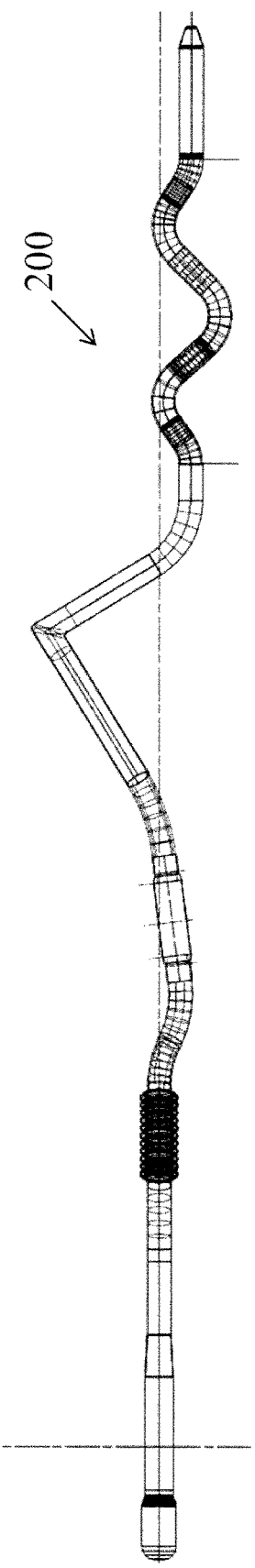

PIPE-SHAPED INTEGRALLY MOLDED ARTICLE AND PRODUCTION METHOD FOR PIPE-SHAPED INTEGRALLY MOLDED ARTICLE

TECHNICAL FIELD OF THE INVENTION

The present invention relates to a pipe-shaped integrally molded article using a polyphenylene sulfide resin composition with excellent mechanical properties, heat resistance and chemical resistance, and a production method for a pipe-shaped integrally molded article.

BACKGROUND ART OF THE INVENTION

In recent years, the demand for lightening transportation equipment including automobiles has been more increasing. Metal plumbing components have been used in automobiles, including engine cooling pipes, but in recent years, plumbing components made of thermoplastic resins have been used from the background of lightening for the purpose of improving fuel efficiency. Further, in transportation equipment such as automobiles, improvement of space utilization rate is also an important subject so as to efficiently utilize a limited space. In order to effectively utilize the limited space, the device such as a pipe arranged in the transportation equipment tends to be distributed at a route complicatedly bent three-dimensionally.

As a production method for a plumbing component using a thermoplastic resin, a tube (or pipe) extrusion molding method is known. Further, a production method for a plumbing component using a blow molding method is also examined recently for the purpose of improving the production efficiency.

In the meantime, in association with increase in power output of a power train system of an automobile, heat resistance and chemical resistance required for a plumbing component are also important requirements, and a plumbing component using a polyphenylene sulfide resin (hereinafter, it may be abbreviated as PPS resin) which is excellent in those properties is also being examined.

In Patent document 1, disclosed is a method for efficiently forming a bent section in a tube molded article made of a thermoplastic resin.

In Patent document 2, disclosed is a method for producing a blow molded article having a bent section by optimizing a mold temperature and the like in a suction type blow molding.

In Patent document 3, disclosed is a polyphenylene sulfide resin composition excellent in blow moldability which improves its drawdown property by optimizing its melt tension.

PRIOR ART DOCUMENTS

Patent Documents

Patent document 1: JP-A 2003-305768
Patent document 2: JP-A 5-104613
Patent document 3: JP-A 5-230372

SUMMARY OF THE INVENTION

Problems to be Solved by the Invention

In a plumbing component of transportation equipment such as automobiles, since a space available therefor is limited as described above, it often has a complicated three-dimensional shape. In order to obtain a three-dimensional plumbing component, there is a method for performing a bending processing as described in Patent document 1 to a linear article obtained by extrusion molding in a form of a tube (or pipe) at a later process, and joining a plurality of molded articles after the processing together so as to achieve an appropriate shape. However, in this method, there were problems that the bending process became complicated due to increase of bent sections and difference between bending angles, and that, in particular, the production efficiency was poor because it was necessary to join together a plurality of molded articles after the processing.

In Patent document 2, disclosed are a production method of a long bent tube using a suction-type blow molding method, and a bent tube using a polyamide 66 resin composition with a length of 700 mm and an outer diameter of 20 mm. However, there were many requirements of plumbing components for automobiles with a length over 700 mm, and in case of lack of length, a later processing for joining a plurality of tubes was necessary. In addition, there was a problem in that the polyamide 66 resin composition was insufficient in heat resistance and chemical resistance required for plumbing components of automobiles in recent years.

In Patent document 3, although a method for making the melt tension of a PPS resin composition more than a certain value is disclosed as a method for obtaining a PPS resin composition suitable for blow molding method, no study has been made with respect to molding a long tube route in a complicated form as an integrally molded article. Further, in the suction type blow molding, since it is necessary to suck a molten resin into a mold and make the molten resin follow to a product shape which has been defined in the mold, if the melt tension is too high, there is a possibility that the followability may decrease, which may cause an irregular thickness and a poor appearance of a molded article. Therefore, the resin composition described in Patent document 3 was unsuitable for the molding by the suction type blow molding method.

An object of the present invention is to obtain a long pipe-shaped integrally molded article including a three-dimensionally complicated shape such as a bent section, and a production method thereof, using a PPS resin composition excellent in heat resistance and chemical resistance.

Means for Solving the Problems

As a result of earnest studies to solve the problems in above-described conventional technologies, the inventors have reached the present invention. Namely, the present invention has the following constitution.

(1) A pipe-shaped integrally molded article, formed by molding a polyphenylene sulfide resin composition, and having, at one or more portions thereof, at least one selected from a different-shape section, a bent section and a different-diameter section, characterized in that a total length L (mm) of the pipe-shaped integrally molded article is 1000 or more, and a ratio (L/D) of the total length L (mm) to an outer diameter D (mm) of the pipe-shaped integrally molded article is 20 or more.

(2) The pipe-shaped integrally molded article according to (1), wherein a take-off breaking speed V (m/min) of the polyphenylene sulfide resin composition at a state being molten is 20 or more.

(3) The pipe-shaped integrally molded article according to (1) or (2), wherein a melt tension N (mN) at breakage of the polyphenylene sulfide resin composition is 10 or more and 50 or less.

(4) The pipe-shaped integrally molded article according to any of (1) to (3), wherein, when a wall thickness of a straight cylinder section extending straightly in the pipe-shaped integrally molded article is referred to as A (mm), and a wall thickness of the different-shape section, the bent section or the different-diameter section is referred to as B (mm), a wall thickness change rate C, which is a rate of change of the wall thickness B to the wall thickness A, is within 15%.

(5) The pipe-shaped integrally molded article according to any of (1) to (4), wherein the flexural modulus of the polyphenylene sulfide resin compositions is 0.1 GPa or more and 4.5 GPa or less.

(6) The pipe-shaped integrally molded article according to any of (1) to (5), wherein the polyphenylene sulfide resin composition is a polyphenylene sulfide resin composition compounded with (b) 5 to 100 parts by weight of a polyolefin-based resin and (c) 10 to 45 parts by weight of an inorganic filler relative to (a) 100 parts by weight of a polyphenylene sulfide resin.

(7) A method for producing a pipe-shaped integrally molded article characterized in that the pipe-shaped integrally molded article according to any of (1) to (6) is molded within a single melt solidification cycle.

(8) The method for producing a pipe-shaped integrally molded article according to (7), wherein a mold having an opening at each of an upper end and a lower end is used, a molten parison is supplied from the opening at the upper end of the mold, and a blow molding is performed while the inside of the mold is sucked through the opening at the lower end of the mold.

Effect According to the Invention

According to the present invention, using the PPS resin composition with excellent heat resistance and chemical resistance, it is possible to easily produce a long hollow integrally molded article including a three-dimensionally complicated shape, and it is possible to efficiently provide a desired pipe-shaped integrally molded article.

BRIEF EXPLANATION OF THE DRAWINGS

FIG. 1A is an external view showing an example of a pipe-shaped integrally molded article for which the moldability of a pipe-shaped integrally molded article according to the present invention was evaluated in an Example.

FIG. 1B is an external view showing another example of a pipe-shaped integrally molded article for which the moldability of a pipe-shaped integrally molded article according to the present invention was evaluated in an Example.

EMBODIMENTS FOR CARRYING OUT THE INVENTION

Hereinafter, embodiments of the present invention will be explained with reference to the drawings.

(1) Pipe-Shaped Integrally Molded Article:

The pipe-shaped integrally molded article according to the present invention indicates a pipe-shaped integrally molded article that includes not only a straight cylinder section formed cylindrical and extending straightly but also at least one shaped section selected from a different-shape section, a bent section and a different-diameter section, at one or more portions thereof. As the shape of the pipe-shaped integrally molded article, exemplified are a pipe-shaped integrally molded article 100 including a plurality of bent sections shown in FIG. 1A as an example, and a molded article used for evaluation in the present invention such as a pipe-shaped integrally molded article 200 including corrugated portions shown in FIG. 1B. As long as the pipe-shaped integrally molded article according to the present invention is a pipe-shaped integrally molded article including at least one shaped section selected from a different-shape section, a bent section and a different-diameter section, at one or more portions thereof, it is not limited to the shapes shown in FIG. 1A and FIG. 1B.

Figure 2A:
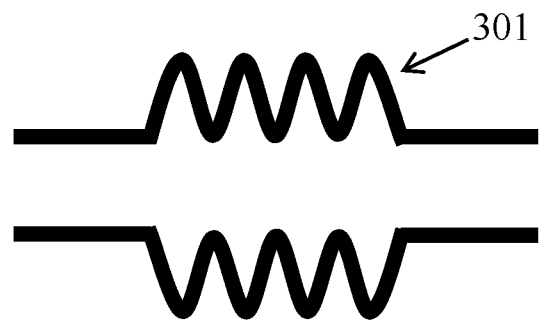
FIG. 2A is a schematic sectional view showing an example of a different-diameter section of a pipe-shaped integrally molded article according to the present invention.
Figure 2B:
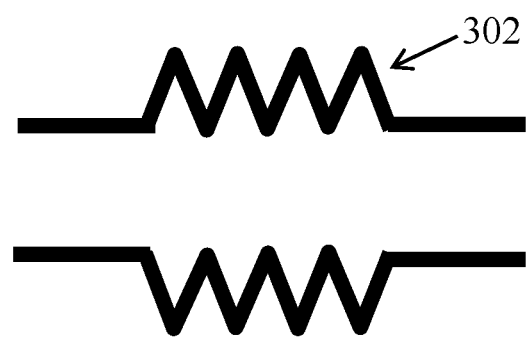
FIG. 2B is a schematic sectional view showing another example of a different-diameter section of a pipe-shaped integrally molded article according to the present invention.
Figure 2C:
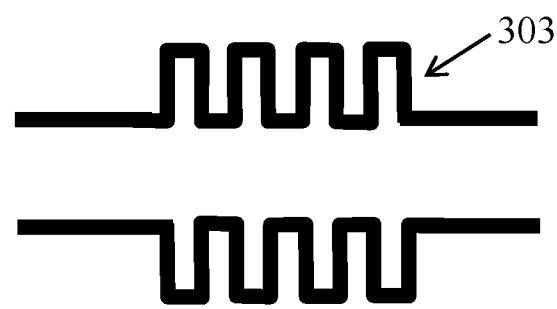
FIG. 2C is a schematic sectional view showing a further example of a different-diameter section of a pipe-shaped integrally molded article according to the present invention.
Figure 2D:
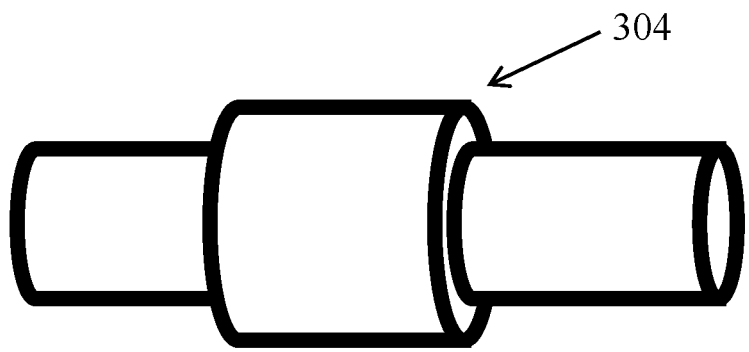
FIG. 2D is a schematic perspective view showing a still further example of a different-diameter section of a pipe-shaped integrally molded article according to the present invention.
Figure 2E:
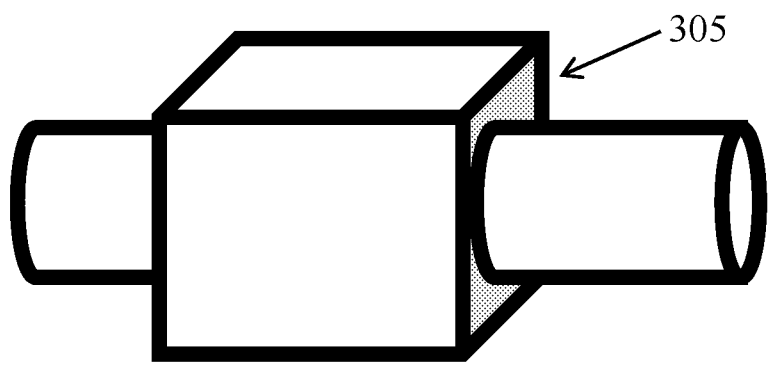
FIG. 2E is a schematic perspective view showing an example of a different-shape section of a pipe-shaped integrally molded article according to the present invention.

The different-shape section, bent section and different-diameter section used herein are known shapes generally used in plumbing components and the like, and are not limited to specific shapes. Where, the different-shape section in the present invention indicates a section in which the sectional shape is different from that of other sections in the longitudinal direction of a pipe-shaped integrally molded article, for example, indicates a section having a square cross-section in a pipe-shaped integrally molded article formed in a circular cross-sectional shape. Further, the different-diameter section in the present invention indicates a section in which the sectional diameter is different from that of other sections in the longitudinal direction of a pipe-shaped integrally molded article, or a section in which the sectional diameter is changing, for example, indicates a section having a corrugated shape. As examples of different-diameter sections in the present invention, exemplified are a different-diameter section 301 with a rounded corrugate-shaped tip shown in FIG. 2A, a different-diameter section 302 with a pointed corrugate-shaped tip shown in FIG. 2B, a different-diameter section 303 formed in a corrugate pipe shape shown in FIG. 2C, and a different-diameter section 304 formed in a section of a molded article shown in FIG. 2D in which the diameter changes in the middle of the molded article (in the illustrated example, a section changed to be a greater diameter). As an example of the different-shape section, a different-shape section 305 formed in a square cross-sectional shape shown in FIG. 2E is exemplified. However, the formations of the different-diameter sections and the different-shape sections are not particularly limited to these.

The pipe-shaped integrally molded article of the present invention is characterized in that a total length L (mm) of the pipe-shaped integrally molded article is 1000 or more, and a ratio (L/D) of the total length L (mm) to an outer diameter D (mm) of the pipe-shaped integrally molded article is 20 or more. The upper limit of the total length L (mm) in the present invention is approximately 4000 according to the specification of a general suction-type blow molder. Where, the outer diameter D (mm) of the pipe-shaped integrally molded article is preferably 5 or more and 80 or less. More preferably, it is 10 or more and 60 or less. The upper limit of the outer diameter D (mm) in the present invention is preferably around 100 for product applications in which the pipe-shaped integrally molded article of the present invention is used. Where, in the present invention, the outer diameter D (mm) of the pipe-shaped integrally molded article indicates the largest outer diameter in the pipe-shaped integrally molded article. In case where the cross-section of the pipe-shaped integrally molded article is not a circle, the diameter of a circumscribed circle relative to the cross-section of the integrally molded article is defined as the outer diameter D. The ratio (L/D) of the total length L (mm) to the outer diameter D (mm) of the pipe-shaped integrally molded article is 20 or more, preferably 40 or more, more preferably 50 or more. The upper limit of (L/D) is preferably around 700 in view of the upper limit of the total length of the pipe-shaped integrally molded article in the present invention.

The pipe-shaped integrally molded article of the present invention is preferably shaped to include a straight cylinder section formed cylindrical and extending straightly. Here, a straight cylinder section extending straightly indicates a section continuously extending straightly in a lengthwise direction at a state having an outer diameter D (mm) of the pipe-shaped integrally molded article or more. Further, it is preferred that, when a wall thickness of the straight cylinder section extending straightly is referred to as A (mm) and a wall thickness of any one shaped section selected from a different-shape section, a bent section and a different-diameter section is referred to as B (mm), a wall thickness change rate C, which is a rate of change of the wall thickness B (mm) to the wall thickness A (mm), is 15% or less. By making the wall thickness change rate C to be 15% or less, it is possible to obtain a pipe-shaped integrally molded article having a uniform thickness, and therefore, since the mechanical strength is high and a stress concentration to a wall thickness change section is small, it is possible to obtain a molded article excellent also in internal pressure strength. The wall thickness change rate C is preferable as it is smaller, and it is preferably 15% or less, more preferably 10% or less, further preferably 5% or less.

Where, in the measurement of the wall thickness in the present invention, the pipe-shaped integrally molded article is cut perpendicular to the length direction, the thickness at the cut surface is measured as the wall thickness. The wall thickness change rate C (%) is determined using Equation 1.

$$|B/A - 1| \times 100 \quad \text{(Equation 1)}$$

Further, with the wall thickness change rate C (%) in the bent section, a wall thickness change rate of a wall thickness Bo of an outer-side portion of the bent section to the wall thickness A, and a wall thickness change rate of a wall thickness Bi of an inner-side portion of the bent section to the wall thickness A, are determined, respectively, and a larger one of them is defined as the wall thickness change rate C (%) of the bent section.

The pipe-shaped integrally molded article according to the present invention is molded within a single melt solidification cycle.

The melt solidification cycle in the present invention comprises two processes: a plasticization process in which a resin is heated at a melting point thereof or higher and molten, and a cooling process in which the resin molten in the plasticization process is cooled and solidified at a crystallization temperature or lower in a mold. The pipe-shaped integrally molded article according to the present invention is a molded article in which the resin is molded through the plasticizing process and the cooling process, each at one time in this order. In case where a certain processing is performed after the melt solidification cycle of the present invention, that is, after the cooling process, the processing process is considered outside the scope of the melt solidification cycle of the present invention. In this case, the certain processing means, for example, bending, or joining a plurality of parts mechanically or thermally.

The pipe-shaped integrally molded article of the present invention is preferably a pipe-shaped integrally molded article comprising a polyphenylene sulfide resin composition compounded with (b) 5 to 100 parts by weight of a polyolefin-based resin and (c) 10 to 45 parts by weight of inorganic fillers relative to (a) 100 parts by weight of a polyphenylene sulfide resin, as described later. Usually, in case of attempting to form a different-shape section a bent section, or a different-diameter section when making a pipe-shaped molded article using a thermoplastic resin composition containing inorganic fillers, it is not possible to form such a shape unless it is made within a single melt solidification cycle. A pipe-shaped integrally molded article composed of a thermoplastic resin composition containing inorganic fillers is excellent in strength, strength retention rate in high temperature environment, and dimensional change of a molded article, as compared with a pipe-shaped integrally molded article using no inorganic fillers.

(2) Melt Solidification Cycle:

The melt solidification cycle in the present invention comprises two processes: a plasticization process in which a resin is heated at a melting point thereof or higher and molten, and a cooling process in which the resin molten in the plasticization process is cooled and solidified at a crystallization temperature or lower in a mold, as aforementioned. In the plasticization process, since the melting point of a PPS resin is generally 280° C., it is preferred to heat at a temperature of 280° C. or more, preferably to heat in a range of 300° C. or higher to 330° C. or lower. By controlling at such a temperature, it is possible to melt the PPS resin composition uniformly, and to obtain a good molding processability.

Further, in case of the PPS resin composition, the mold temperature of the cooling process is preferably 80° C. or lower, or 120° C. or higher to 150° C. or lower. On the other hand, around 90° C., which is the glass transition temperature of the PPS resin composition, is not preferred, because the crystallization behavior is not stabilized and a release defect, etc. may occur when taking out a molded article from the mold.

(3) Suction Blow Molding:

[Suction Type Blow Molding Apparatus]

Figure 3:
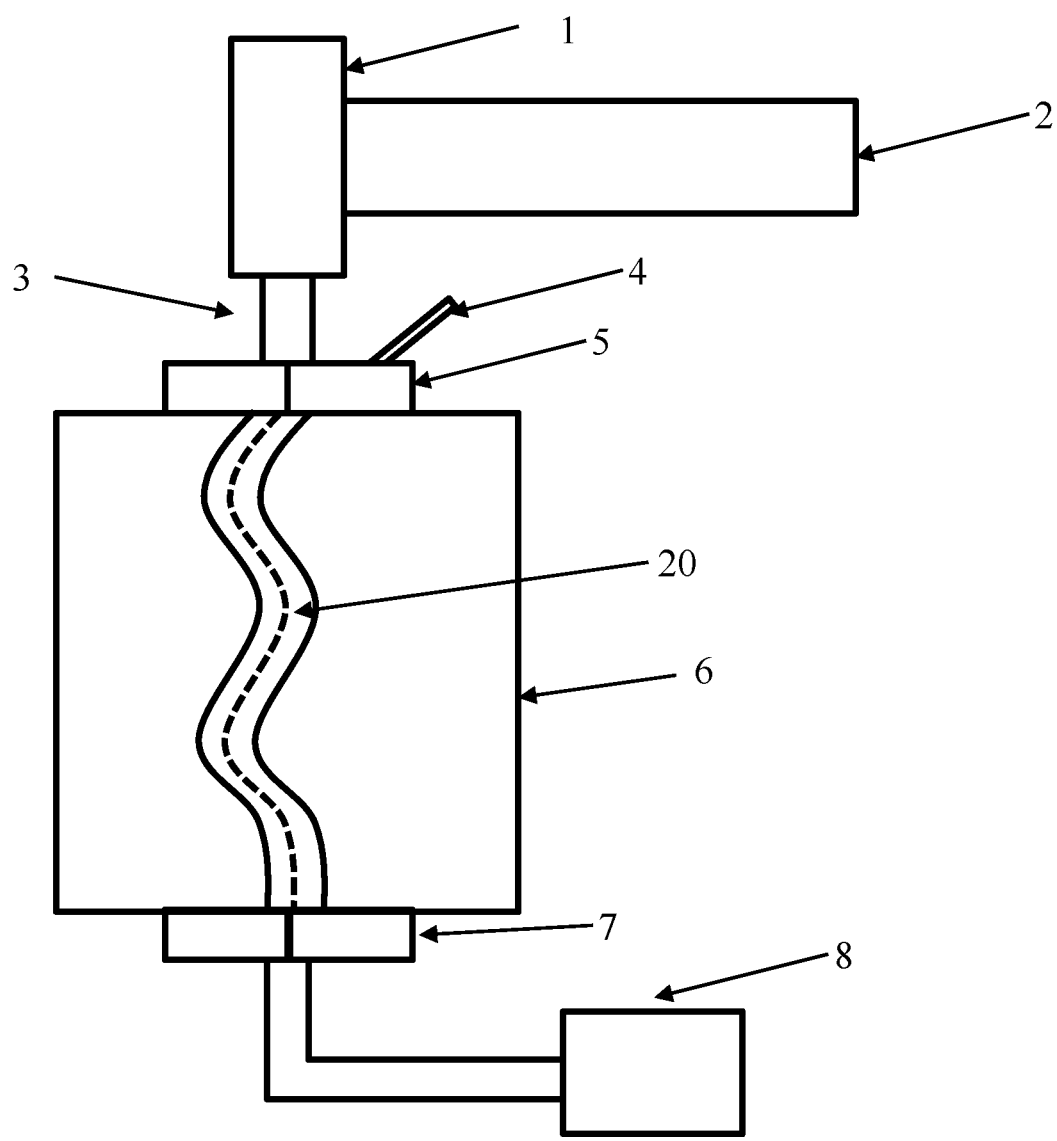
FIG. 3 is a schematic diagram showing an example of a suction-type blow molding apparatus.

FIG. 3 shows a schematic constitution of a suction type blow molding apparatus used in the suction type blow molding method in the present invention. The molding apparatus used in the suction type blow molding method comprises an extruder 1 shown in FIG. 3 as a plasticizing process of a resin, a die head 2 with an accumulator for discharging a parison at the tip, and an a mold 6 provided with a suction mechanism 8 for shaping and cooling the parison 3.

The mold 6 provided with the suction mechanism 8 shown in FIG. 3 will be explained.

The mold 6 has a cavity with an opening at each of the upper end and the lower end, and has an upper shutter mechanism 5 with a function of supplying and blowing air from an air supply portion 4 in the parison 3 at the upper end opening, and a lower shutter mechanism 7 connected with the suction mechanism 8 which sucks the air in the mold 6 is provided at the mold lower end. Symbol 20 indicates the parting line of the mold 6.

As long as the above-described mechanism is provided, the respective specifications and shapes of the extruder 1 for the plasticization process, the die head 2 with the accumulator and the mold 6 provided with the suction mechanism 8 are not particularly limited.

[Suction Type Blow Molding Method]

The suction type blow molding method in the present invention uses the suction type blow molding apparatus aforementioned, discharges the molten resin plasticized by the extruder as a parison from the die head with an accumulator and supplies it from the upper part of the mold provided with the suction mechanism, and at the stage when the parison enters into the mold, generates an air flow in the mold using the suction mechanism, and sucks the parison and introduces it into the cavity. This method is a method for blow molding a molded article by suctioning the parison into the predetermined mold at a predetermined amount, then closing the shutters at the upper and lower ends and simultaneously supplying air into the parison from the air supply portion at the upper end, and by this method, a targeted molded article can be obtained.

For molding of the pipe-shaped integrally molded article of the present invention, because a shape of a molded article is a shape with a large length and thin diameter, a suction type blow molding method which can introduce the molten resin after plasticization into the mold in a short time and form a complicated shape is suitable. A known direct blow molding method cannot introduce the parison into the cavity, and a known three-dimensional blow molding method is not preferred as the production method of the pipe-shaped integrally molded article according to the present invention, because it takes time to form it after plasticizing and therefore the parison solidifies.

(4) Take-Off Breaking Speed at Molten State:

The take-off breaking speed V (m/min) of the PPS resin composition at a state being molten indicates melting properties of the resin composition at the time of extruding the molten PPS resin composition in a form of a strand and taking it off at a constant acceleration. The take-off breaking speed V of the PPS resin composition indicates melting properties of the resin composition at the time of extruding the molten PPS resin composition in a form of a strand and taking it off at a constant acceleration. The take-off breaking speed of the PPS resin composition at a state being molten can be determined using "Capilograph" 1D supplied by Toyo Seiki Corporation.

In the present invention, using the device described above, a PPS resin composition molten in a capillary at 320° C. with a capillary length of 40 (mm) and a capillary diameter of 1 (mm) is extruded into a form of a strand at a speed of 75 (mm/min) and taken off at an initial speed of 15 (mm/min) and an acceleration of 15 (mm/min$^2$) by a take-off roller through a pulley for tension measurement, and a take-off speed at the time when the strand breaks can be determined as the "take-off breaking speed V (m/min) at molten state".

From the viewpoint of the followability of the parison to the mold in the suction type blow molding method, the take-off breaking speed V (m/min) of the PPS resin composition at a state being molten is preferably 20 or more, and the upper limit thereof is preferably 30 or less. Further, it is desired to be compatible with the preferable range of a melt tension N at take-off breakage described later.

From the viewpoint of prevention of drawdown in the blow molding, the melt tension N (mN) at breakage of the PPS resin composition is preferably 10 or more and 50 or less, and a range of 10 or more and 40 or less is more preferable, because a molded article with a good appearance can be obtained in addition to prevention of drawdown.

As an example of a method for bringing the take-off breaking speed of the PPS resin composition within the aforementioned preferable range, there is a method for adjusting the melt viscosity and crystallization temperature of the PPS resin used in the PPS resin composition. Further, in addition to that, the kind or compounding amount of olefin-based resin and inorganic filler used for the PPS resin composition may be adjusted.

(5) Melt Tension at Take-Off Breakage:

The melt tension N (mN) at take-off breakage of the PPS resin composition at a state being molten in the present invention indicates melting properties of the resin composition at the time of extruding the molten PPS resin composition in a form of a strand and taking it off at a constant acceleration. The melt tension at breakage can be determined using "Capilograph" 1D supplied by Toyo Seiki Corporation.

In the present invention, using the device described above, a PPS resin composition molten in a capillary at 320° C. with a capillary length of 40 (mm) and a capillary diameter of 1 (mm) is extruded into a form of a strand at a speed of 75 (mm/min) and taken off at an initial speed of 15 (mm/min) and an acceleration of 15 (mm/min$^2$) by a take-off roller through a pulley for tension measurement, and a tension detected by the pulley for tension measurement at the time when the strand breaks can be determined as the "melt tension N (mN) at take-off breakage".

In the present invention, as aforementioned, from the viewpoint of prevention of drawdown in the blow molding, the melt tension N (mN) at breakage of the PPS resin composition is preferably 10 or more and 50 or less, and a range of 10 or more and 40 or less is more preferable, because a molded article with a good appearance can be obtained in addition to prevention of drawdown. Further, it is desired to be compatible with the preferable range of the aforementioned take-off breaking speed V at molten state.

As an example of a method for bringing the melt tension at take-off breakage of the PPS resin composition within the preferred range aforementioned, there is a method for adjusting the melt viscosity and crystallization temperature of the PPS resin used in the PPS resin composition. Further, in addition to that, the kind or compounding amount of olefin-based resin and inorganic filler used for the PPS resin composition may be adjusted.

(6) PPS Resin

The PPS resin used in the present invention is a polymer having a repeated unit shown in the following Chemical formula 1.

[Chemical formula 1]

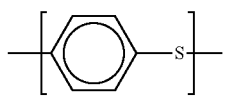

From the viewpoint of heat resistance, the PPS resin is preferably a polymer which contains a polymer having the repeated unit shown in the above-described chemical formula at 70 mol % or more, preferably 90 mol % or more. Further, 30 mol % or less of the repeated units of the PPS resin may be composed of repeated units shown in the following Chemical formula 2 or the like.

[Chemical formula 2]

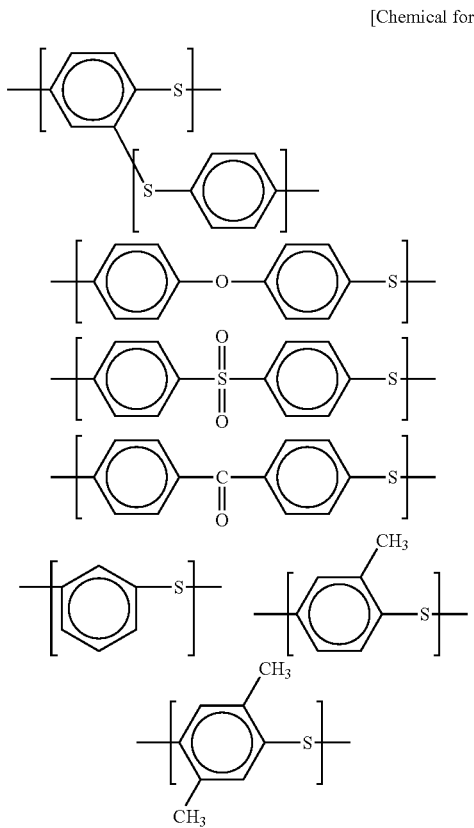

A PPS copolymer having such a structure at a part thereof has an advantage in terms of moldability because its melting point becomes low.

Although the melt viscosity of the PPS resin is not particularly limited, the melt viscosity is preferably to be higher because a more excellent tensile breaking elongation can be obtained. The melt viscosity is preferably over 30 Pa·s (300° C., shear rate 1000/s), more preferably 50 Pa·s or more, further preferably 100 Pa·s or more. The upper limit of the melt viscosity is preferably 600 Pa·s or less from the viewpoint of maintaining the melt flowability. Where, the melting viscosity in the present invention is a value measured using "Capilograph" supplied by Toyo Seiki Corporation under conditions of a temperature of 300° C. and a shear rate of 1000/s.

From the viewpoint of improving the reactivity with additives such as a silane compound described later, the total content of alkali metal and alkaline earth metal contained in the PPS resin to be compounded is preferably less than 400 ppm, more preferably less than 200 ppm, further preferably less than 100 ppm. The total content of alkali metal and alkaline earth metal contained in the PPS resin particularly has no lower limit. If the total content of alkali metal and alkaline earth metal contained in the PPS resin is 1000 ppm or more, since there is a possibility that the reactivity between the PPS resin and additives such as a silane compound may be reduced, such a condition is not preferable.

Where, the total content of alkali metal and alkaline earth metal in the PPS resin is a value obtained by preparing an aqueous solution diluted with 0.1 N hydrochloric acid aqueous solution and 0.1% lanthanum chloride aqueous solution as a sample after ashing 5 g of the PPS resin in an electric reactor at 500° C., and determining it by atomic absorption spectrophotometry using Atomic Absorption Spectrophotometry AA-6300 supplied by Shimadzu Corporation.

The PPS resin can also be used by, after the completion of polymerization, performing high molecular weight treatment by thermal oxidative crosslinking treatment due to heating under an oxygen atmosphere or heating added with a crosslinking agent such as peroxide. From the viewpoint of exhibiting an excellent elongation after the dry heat treatment, it is preferred to prepare the PPS resin composition from a raw material of a substantially straight-chain PPS resin in which high molecular weight treatment by thermal oxidative crosslinking treatment is not performed, or a semi-crosslinked PPS resin in which oxidative crosslinking treatment is performed at a small degree.

From the viewpoint of exhibiting an excellent elongation after the dry heat treatment, the number average molecular weight of the PPS resin served to the compounding is preferably 10,000 or more, and more preferably 13,000 or more. If the number average molecular weight of the PPS resin is less than 10,000, it is not preferred because the entanglement between molecular chains is insufficient. Although the upper limit of the number average molecular weight of the PPS resin is not particularly limited, it is preferred to be 50,000 or less from the viewpoint of molding processability.

The number-average molecular weight (Mn) of the PPS resin referred here is a value calculated in terms of polystyrene using gel permeation chromatography (GPC).

(7) Polyolefin-Based Resin

The polyolefin-based resin (b) used in the present invention includes "olefin copolymer with an epoxy group" and "ethylene·α-olefin-based copolymer" obtained by copolymerizing ethylene with an α-olefin having a carbon number of 3 to 20.

Olefin Copolymer with Epoxy Group

As the olefin copolymer with an epoxy group (an olefin copolymer containing an epoxy group) used in the present invention, an olefin copolymer obtained by introducing a monomer component with an epoxy group into an olefin-based (co)polymer is exemplified. Further, a copolymer obtained by epoxidizing a double-bond part of an olefin-based polymer having a double bond in its main chain can also be used.

As examples of components containing a functional group for introducing a monomer component with an epoxy group into an olefin-based (co)polymer, exemplified are monomers having an epoxy group such as glycidyl acrylate, glycidyl methacrylate, glycidyl ethacrylate, glycidyl itaconate, and glycidyl citraconate.

The method of introducing these epoxy group-containing components is not particularly restricted, and it is possible to use such methods as copolymerization with α-olefin, etc. and graft introduction using a radical initiator to the olefin (co)polymer.

It is appropriate that the introduction amount of the monomer component containing the epoxy group is within a range of 0.001 to 40 mol %, preferably 0.01 to 35 mol % relative to the whole of the monomers which become the raw materials of the olefin-based copolymer containing the epoxy group.

As the epoxy group-containing olefin copolymer particularly useful in the present invention, an olefin-based copolymer with a copolymerization component composed of an α-olefin and a glycidyl ester of α,β-unsaturated carboxylic acid can be preferably exemplified. As the above-described α-olefin, ethylene is preferably exemplified. Further, these copolymers can also be copolymerized with α,β-unsaturated carboxylic acids such as acrylic acid, methyl acrylate, ethyl acrylate, butyl acrylate, methacrylic acid, methyl methacrylate, ethyl methacrylate and butyl methacrylate, and alkyl esters thereof, styrene, acrylonitrile, and the like.

Further, such olefin copolymers may be any of random, alternate, block, or graft copolymerization mode.

In the present invention, it is particularly preferable to use an olefin copolymer copolymerized with an α-olefin and a glycidyl ester of α,β-unsaturated carboxylic acid, and especially, an olefin-based copolymer copolymerized with 60-99% by weight of an α-olefin and 1-40% by weight of a glycidyl ester of α,β-unsaturated carboxylic acid is particularly preferred.

The above-described glycidyl ester of α,β-unsaturated carboxylic acid is a compound indicated by the following chemical formula 3 (R indicates a hydrogen atom or lower alkyl group), and concretely, glycidyl acrylate, glycidyl methacrylate and glycidyl ethacrylate are exemplified, and among those, glycidyl methacrylate is preferably used.

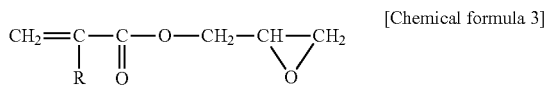

[Chemical formula 3]

As concrete examples of olefin-based copolymers containing glycidyl esters of α,β-unsaturated carboxylic acids as essential copolymerization components, ethylene/propylene-g-glycidyl methacrylate copolymer ("g" represents graft, hereinafter the same), ethylene/butene-1-g-glycidyl methacrylate copolymer, ethylene-glycidyl methacrylate copolymer-g-polystyrene, ethylene-glycidyl methacrylate copolymer-g-acrylonitrile-styrene copolymer, ethylene-glycidyl methacrylate copolymer-g-PMMA, ethylene/glycidyl acrylate copolymer, ethylene/glycidyl methacrylate copolymer, ethylene/methyl acrylate/glycidyl methacrylate copolymer, and ethylene/methyl methacrylate/glycidyl methacrylate copolymer can be exemplified. Among them, ethylene/glycidyl methacrylate copolymer, ethylene/methyl acrylate/glycidyl methacrylate copolymer, and ethylene/methyl methacrylate/glycidyl methacrylate copolymer are preferably used.

Ethylene•α-olefin-based Copolymer

Ethylene•α-olefin-based copolymer obtained by copolymerization of ethylene and α-olefin with a number of carbon atoms of 3 to 20, which is particularly useful in the present invention, is a copolymer whose components are ethylene and at least one α-olefin with a number of carbon atoms of 3 to 20. As the above-described α-olefin with a number of carbon atoms of 3 to 20, exemplified are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof. Among these α-olefins, copolymers using α-olefins with a number of carbon atoms of 6 to 12 are more preferable because mechanical strength is improved.

As the polyolefin-based resin (b) used in the present invention, it is preferred to use two kinds of the aforementioned olefin-based resin having an epoxy group and ethylene•α-olefin-based copolymer together.

The compounding rate of (b) polyolefin-based resin in the PPS resin composition of the present invention is preferably 5 to 100 parts by weight relative to (a) PPS resin of 100 parts by weight, in order to exhibit a melt tension and a take-off breaking speed suitable for suction-type blow molding. It is more preferably 10 to 90 parts by weight, further preferably 20 to 80 parts by weight.

(8) Inorganic Filler

As the inorganic filler (c) used in the resin composition in the present invention, concretely, as fibrous fibers, exemplified are glass fibers, glass milled fibers, glass flat fibers, different-shape section glass fibers, glass cut fibers, plane glass fibers, stainless fibers, aluminum fibers, brass fibers, rock wool, carbon fibers of PAN based or pitch based, carbon nanotubes, carbon nanofibers, calcium carbonate whiskers, wollastonite whiskers, potassium titanate whiskers, barium titanate whiskers, aluminum borate whiskers, silicon nitride whiskers, aramid fibers, alumina fibers, silicon carbide fibers, asbestos fibers, gypsum fibers, ceramic fibers, zirconia fibers, silica fibers, titanium oxide fibers, silicon carbide fibers, and the like. Further, as concrete examples of non-fibrous fibers, exemplified are talc, wollastonite, zeolite, sericite, mica, kaolin, clay, pyrophyllite, bentonite, asbestos, alumina silicate, silicate such as hydrotalcite, silicon oxide, glass powder, magnesium oxide, aluminum oxide (alumina), silica (crushed and spherical), quartz, glass beads, glass flakes, crushed and irregular shaped glass, glass micro-balloons, molybdenum disulfide, aluminum oxide (crushed), translucent alumina (fibrous, plate-like, scale-like, granular, indefinite-shaped, and crushed products), oxides such as titanium oxide (crushed), and zinc oxide (fibrous, plate-like, scale-like, granular, indefinite-shaped, and crushed products), carbonates such as calcium carbonate, magnesium carbonate, and zinc carbonate, sulfates such as calcium sulfate, and barium sulfate, hydroxides such as calcium hydroxide, magnesium hydroxide, and aluminum hydroxide, silicon carbide, carbon black and silica, graphite, aluminum nitride, translucent aluminum nitride (fibrous, plate-like, scale-like, granular, indefinite-shaped, crushed products), calcium polyphosphate, graphite, metal powder, metal flakes, metal ribbons, metal oxides, and the like. Where, as concrete examples of metal kinds of metal powder, metal flakes and metal ribbons, silver, nickel, copper, zinc, aluminum, stainless steel, iron, brass, chromium, tin, and the like can be exemplified. Also, carbon powder, graphite, carbon flakes, scale-like carbon, fullerenes, graphene, etc. are exemplified.

Furthermore, these inorganic fillers may be used after being pretreated with a coupling agent such as isocyanate-based compounds, organic silane-based compounds, organic titanate-based compounds, organic borane-based compounds and epoxy compounds. Among them, glass fibers, carbon fibers, calcium carbonate, carbon black and graphite are particularly preferred.

As the inorganic filler used in the present invention, glass fibers, which are considered to be excellent in effect for improving mechanical strength, are preferably used, and the compounding rate thereof is preferably 10 to 45 parts by weight relative to (a) PPS resin of 100 parts by weight. More preferably, it is in a range of 15 to 35 parts by weight.

The PPS resin compositions used in the present invention can be further compounded with various additives as explained as follows.

(1) Antioxidant

In the present invention, in order to maintain high thermal resistance and thermal stability, it is preferred to compound at least one antioxidant selected from phenolic and phosphoric compounds relative to 100 parts by weight of PPS resin. The compounding amount of such an antioxidant is preferably 0.01 part by weight or more, particularly, 0.02 part by weight or more, from the viewpoint of the thermal resistance improving effect, and is preferably 5 parts by weight or less, particularly, 1 part by weight or less, from the viewpoint of the gas components generated during molding. Further, the combined use of phenolic and phosphoric antioxidants is particularly preferred because the effect for maintaining thermal resistance and thermal stability is remarkable.

As the phenolic antioxidant, hindered phenolic compounds are preferably used, and as concrete examples, exemplified are triethylene glycol-bis[3-t-butyl-(5-methyl-4-hydroxyphenyl) propionate], N,N'-hexamethylene bis(3, 5-di-t-butyl-4-hydroxy-hydrocinnamide), tetraki s[methylene-3-(3',5'-di-t-butyl-4'-hydroxyphenyl) propionate] methane, pentaerythrityl tetrakis[3-(3',5'-di-t-butyl-4'-hydroxyphenyl) propionate], 1,3,5-tris(3,5-di-t-butyl-4-hydroxybenzyl)-s-triazine-2,4,6-(1H,3H,5H)-trione, 1,1,3-tris (2-methyl-4-hydroxy-5-t-butylphenyl) butane, 4,4'-butylidene bis(3-methyl-6-t-butylphenol), n-octadecyl-3-(3, 5-di-t-butyl-4-hydroxy-phenyl) propionate, 3,9-bis[2-(3-(3-t-butyl-4-hydroxy-5-methylphenyl) propionyloxy)-1,1-dimethylethyl]-2,4,8,10-tetraoxaspiro[5,5]undecane, 1,3,5-trimethyl-2,4,6-tris-(3,5-di-t-butyl-4-hydroxybenzyl) benzene, etc. Among them, the esterified macromolecular hindered phenolic type is preferred, concretely, tetrakis [methylene-3-(3',5'-di-t-butyl-4'-hydroxyphenyl) propionate] methane, pentaerythrityl tetrakis[3-(3',5'-di-t-butyl-4'-hydroxyphenyl) propionate], 3,9-bis[2-(3-(3-t-butyl-4-hydroxy-5-methylphenyl) propionyloxy)-1,1-dimethylethyl]-2,4,8,10-tetraoxaspiro[5,5]undecane, etc. are preferably used.

Next, as the phosphoric antioxidants, exemplified are bis(2,6-di-t-butyl-4-methylphenyl) pentaerythritol-di-phosphite, bis(2,4-di-t-butylphenyl) pentaerythritol-di-phosphite, bis(2,4-di-cumylphenyl) pentaerythritol-di-phosphite, tris(2,4-di-t-butylphenyl) phosphite, tetrakis(2,4-di-t-butylphenyl)-4,4'-bisphenylene phosphite, di-stearyl pentaerythritol-di-phosphite, triphenyl phosphite, and 3,5-di-butyl-4-hydroxybenzyl phosphonate diethyl ester, etc.

Among them, in order to reduce volatilization and decomposition of the antioxidant in the compound of the PPS resin, an antioxidant having a high melting point is preferred, and concretely, bis(2,6-di-t-butyl-4-methylphenyl) pentaerythritol-di-phosphite, bis(2,4-di-t-butylphenyl) pentaerythritol-di-phosphite, bis(2,4-di-cumylphenyl) pentaerythritol-di-phosphite, etc. are preferably used.

(2) Flame Retardant

In the present invention, a flame retardant may be compounded to improve the flame retardancy of the resin composition in a range of not damaging the effect of the invention. As the flame retardants, hydrated metal-based flame retardants such as aluminum hydroxide and magnesium hydroxide, brom-based flame retardants, chlorine-based flame retardants, phosphorus-based flame retardants, inorganic flame retardants such as antimony trioxide, etc. are exemplified, and among them, phosphorus-based flame retardants are preferred.

The phosphorus-based flame retardants are not particularly restricted as long as they are compounds having phosphorus atoms, and exemplified are red phosphorus, organophosphates, such as phosphate esters, phosphonic acids and their derivatives (including salts), phosphinic acids and their derivatives (including salts), phosphines, phosphine oxides, biphosphines, phosphonium salts, phosphazenes, phosphaphenanthrene derivatives, and inorganic phosphates, etc.

The content of such flame retardant components is selected from a range of 50% by weight or less of the whole of the resin composition, preferably 30% by weight or less, more preferably 20% by weight or less.

(3) Wear Resistance Improver

In the present invention, from the viewpoint of improving the wear resistance of the resin composition in a range of not damaging the effect of the invention, fluoro-based resins such as polytetrafluoroethylene and ethylene-tetrafluoroethylene, silicone oil, etc. may be added. The amount of such an additive is usually selected from a range of 0.1 to 10% by weight relative to the whole of the resin composition.

(4) Other Additives

Further, the PPS resin composition used in the present invention may be added with a silane compound having at least one functional group selected from the epoxy group, amino group, isocyanate group, hydroxyl group, mercapto group and ureide group in order to improve mechanical strength, toughness, etc. in a range of not damaging the effect of the invention. As concrete examples of such a compound, exemplified are epoxy group-containing alkoxysilane compounds such as γ-glycidoxy propyl trimethoxysilane, γ-glycidoxy propyl triethoxysilane, and β-(3,4-epoxycyclohexyl) ethyl trimethoxysilane, mercapto group-containing alkoxysilane compounds such as γ-mercapto propyl trimethoxysilane, and γ-mercapto propyl triethoxysilane, ureide group-containing alkoxysilane compounds such as γ-ureide propyl triethoxysilane, γ-ureide propyl trimethoxysilane and γ-(2-ureideethyl) aminopropyl trimethoxysilane, isocyanate group-containing alkoxysilane compounds such as γ-isocyanate propyl triethoxysilane, γ-isocyanate propyl trimethoxysilane, γ-isocyanate propyl methyl dimethoxysilane, γ-isocyanate propyl methyl diethoxysilane, γ-isocyanate propyl ethyl dimethoxysilane, γ-isocyanate propyl ethyl diethoxysilane, and γ-isocyanate propyl trichlorosilane, amino group-containing alkoxysilane compounds such as γ-(2-aminoethyl) aminopropyl methyl dimethoxysilane, γ-(2-aminoethyl) aminopropyl trimethoxysilane, γ-aminopropyl trimethoxysilane, and γ-aminopropyl triethoxysilane, hydroxyl group-containing alkoxysilane compounds such as γ-hydroxypropyl trimethoxysilane and γ-hydroxypropyl triethoxysilane, etc. Among them, alkoxysilanes with epoxy, amino, isocyanate or hydroxyl groups are particularly suitable for obtaining excellent weld strength. A preferable addition amount of such a silane compound is selected from a range of 0.05 to 3 parts by weight relative to 100 parts by weight of PPS resin.

The PPS resin composition of the present invention may be further blended further with other resins in a range of not damaging the effect of the invention. Although such blendable resins are not particularly restricted, as the concrete examples thereof, exemplified are polyamide resins such as nylon 6, nylon 66, nylon 610, nylon 11, nylon 12, and aromatic nylon, polyester resins such as polyethylene terephthalate, polybutylene terephthalate, polycyclohexyldimethylene terephthalate, and polynaphthalene terephthalate, and polyethylene, polypropylene, polyether ester elastomer, polyether amide elastomer, polyamide imide, polyacetal, polyimide, polyetherimide, polyethersulfone, polysulfone resin, polyallylsulfone resin, polyketone resin, polyarylate resin, liquid crystal polymer, polyetherketone resin, polythioetherketone resin, polyetheretherketone resin, polyamideimide resin, tetrafluoropolyethylene resin, etc.

Where, to the PPS resin composition of the present invention, other components can be added in a range of not damaging the effect of the invention, for example, can be added antioxidants and thermal-resistance stabilizers (hydroquinone-based) other than those aforementioned, weathering agents (resorcinol-based, salicylate-based, benzotriazole-based, benzophenone-based, hindered amine-based, etc.), release agents and lubricants (montanic acid and its metal salts, its esters, its half esters, stearyl alcohol, stearamide, bis urea, polyethylene wax, etc.), pigments (cadmium sulfide, phthalocyanine, carbon black for coloring, etc.), dyes (nigrosine, etc.), crystal nucleating agents (talc, silica, kaolin, clay, etc.), plasticizers (octyl p-oxybenzoate, N-butylbenzene sulfonamide, etc.), antistatic agents (alkyl sulfate type anionic antistatic agents, quaternary ammonium salt type cationic antistatic agents, nonionic antistatic agents such as polyoxyethylene sorbitan monostearate, betaine-based amphoteric antistatic agents, etc.), thermal stabilizers, lubricants such as calcium stearate, aluminum stearate, and lithium stearate, bisphenol epoxy resins such as bisphenol A type, strength improvers such as novolak phenol type epoxy resins and cresol novolak type epoxy resins, and usual additives such as ultraviolet ray inhibitors, colorants, and foaming agents.

Preparation Method of PPS Resin Composition

Although there is no particular restriction on the preparation method of the PPS resin composition used in the present invention, it is possible to exemplify, as a typical example, such a method for supplying each raw material to a usual known melt kneader such as a single-screw or twin-screw extruder, Banbury mixer, kneader, and mixing roll and kneading at a processing temperature of the melting peak temperature of the PPS resin+5 to +60° C. Concretely, a method of kneading using a twin-screw extruder so that the temperature of the resin at the time of mixing is between +10° C. and +20° C. of the melting peak temperature of the PPS resin, or the like, can be preferably used. In this case, there are no particular restriction on the mixing order of the raw materials, and any of the following methods may be used: a method of melt kneading by the above-described method after compounding all raw materials, a method of melt kneading by the above-described method after compounding a part of raw materials, and further compounding and melt kneading the remaining raw materials, or a method of, after compounding a part of raw materials. mixing the remaining raw materials using a side feeder during melt kneading by a single-screw or twin-screw extruder, or the like. Further, with respect to small amount additive components, of course, it is also possible to knead the other components by the above-described method or the like and pelletize the mixture and then add them before molding to subject them to the molding.

Although the PPS resin composition of the present invention thus obtained can be subjected to injection molding, extrusion molding, suction-type blow molding and various moldings, it is particularly suitable for suction-type blow molding.

In the present invention, a PPS resin composition having a flexural modulus of 0.1 GPa or more and 4.5 GPa or less can be preferably used. In the applicable applications described later, by setting the flexural modulus of the PPS resin composition at 0.1 GPa or more, a sufficient product strength in use for the molded article can be obtained. Further, by setting it at 4.5 GPa or less, a pipe-shaped integrally molded article excellent in flexibility and component assemblability can be obtained. If the PPS resin composition has a flexural modulus of 4.5 GPa or less, a bent section or the like can be formed after molding even by a conventional bending processing, because of its excellent flexibility, and a tubular molded article excellent also in assemblability can be produced, but since the tubular molded article obtained by the method becomes small in thickness of bent processed section, the pressure resistance strength of the tubular molded article decreases. By applying the molding method according to the present invention, it is possible to obtain a pipe-shaped integrally molded article with a constant wall thickness and excellent in pressure resistance strength and flexibility.

Here, the flexural modulus of the PPS resin composition is a value obtained by determination based on ISO178.

As an example of a method for controlling the flexural modulus of the PPS resin composition in the desired range described above, there is a method for adjusting the molecular weight of the PPS resin used in the PPS resin composition. Further, other than that, the type or compounding amount of olefin-based resin and inorganic filler used in the PPS resin composition may be adjusted.

The PPS resin composition used in the present invention is of course capable of being molded to articles other than the pipe-shaped integrally molded article according to the present invention. As applications capable of being applied with the molded article composed of the PPS resin composition used in the present invention, for example, electrical and electronic components typified by sensors, LED lamps, consumer connectors, sockets, resistors, relay cases, switches, coil bobbins, capacitors, variable condenser cases, oscillators, various terminal boards, transformers, plugs, print boards, tuners, speakers, microphones, headphones, small-sized motors, magnetic head bases, semiconductors, liquid crystals, FDD carriages, FDD chassis, motor brush holders, parabolic antennae, computer-related components, etc. are exemplified; and it can also be applied to components of domestic and office electric products typified by VTR components, TV components, irons, hair dryers, rice cooker components, microwave oven components, acoustic components, voice equipment components such as audio laser disc (registered trademark) and compact disc, lighting components, refrigerator components, air conditioner components, type writer components, word processor components, etc. As others, various applications can be exemplified such as machinery-related components typified by office computer-related components, telephone-related components, facsimile-related components, copy machine-related components, cleaning jigs, motor components, lighters, typewriters, etc.: optical equipment and precision machinery-related components typified by microscopes, binoculars, cameras, watches, etc.; and automobile and vehicle-related components typified by valve alternator terminals, alternator connectors, IC regulators, potentiometer bases for light dimmers, various valves for fuel-systems, exhaust and intake systems, air intake nozzle snorkels, intake manifolds, fuel pumps, engine cooling water joints, tubular components for cooling engine, inverter, battery or the like, carburetor main bodies, carburetor spacers, exhaust gas sensors, cooling water sensors, oil temperature sensors, throttle position sensors, crankshaft position sensors, air flow meters, brake pad wear sensors, thermostat bases for air conditioners, heating warm air flow control valves, radiator motor brush holders, water pump impellers, turbine vanes, wiper motor-related components, distributers, starter switches, starter relays, wire harnesses for transmissions, window washer nozzles, air conditioner panel switch boards, fuel-related electromagnetic valve coils, fuse connectors, horn terminals, electrical component insulation plates, stepping motor rotors, lamp sockets, lamp reflectors, lamp housings, brake pistons, solenoid bobbins, engine oil filters, ignition device cases, vehicle speed sensors, cable liners, and the like, can be exemplified.

In particular, the pipe-shaped integrally molded article according to the present invention does not require post-processing such as bending required when forming the different-shape section, different-diameter section and bent section, and further, a tubular component having a complicated shape can be made without joining a plurality of parts, and therefore, it is excellent in the point that tubular components for cooling of engines and various pipes for fuel-related, exhaust and intake systems can be efficiently manu-facture.

EXAMPLES

Hereinafter, the present invention will be explained more concretely showing examples, but the present invention is not limited to the description of these examples.

Evaluation of Moldability of Pipe-Shaped Integrally Molded Article (1) Suction-Type Blow Molding Machine A suction-type brow molding machine KBS20-SB supplied by Kautex Maschinenbau Corporation (German) was used.

(2) Availability of Suction Blow Molding

Using the above-described suction-type blow molding machine, and employing a suction-type blow molding method, the melting temperature of the resin was set at 310° C. and the mold temperature was set at 60° C., and it was determined whether a pipe-shaped integrally molded articles having an outer diameter D of 17 mm, a length L of 1160 mm, and a mean wall thickness of 2 mm shown in FIG. 1A and FIG. 1B could be molded (◯) or could not be molded (x). Where, the mean wall thickness is a mean value of wall thicknesses at 5 points in the straight cylinder section of the pipe-shaped integrally molded article. For the measurement of the wall thickness, the pipe-shaped integrally molded article was cut perpendicular to the lengthwise direction, and the thickness in the cut surface was measured as the wall thickness. In the present invention, the wall thicknesses at the wall thickness measurement portions 1 to 5 shown in FIG. 1A were measured to determine the mean wall thickness. Further, with respect to the wall thickness change rate C (%), the pipe-shaped integrally molded article was cut perpendicular to the lengthwise direction similarly to the above-described manner at the different-shape section, the bent section or the different-diameter section, the wall thickness in each cut surface was measured as the wall thickness B (mm), each change rate of the wall thickness B relative to the wall thickness A (mm) of the straight cylinder section extending straightly in the pipe-shaped integrally molded article (the above described mean wall thickness) was determined as each wall thickness change rate C (%) based on the aforementioned equation 1, and the maximum value of the determined wall thickness change rate sC (%) was defined as the wall thickness change rate C (%) of the pipe-shaped integrally molded article.

Comparative Examples 3 to 4 described later were evaluated as follows.

Evaluation of Bending Processability of Cylinder-Shaped Molded Article (1) Preparation of Cylinder-Shaped Molded Article A cylinder-shaped molded article was prepared using a single-screw extruder supplied by Ikegai Co., Ltd. and using a full fright-type screw with a screw diameter of 40 mm, at a molding temperature of 300° C. The obtained molded article had a linear cylinder shape with an outer diameter of 17 mm, a mean wall thickness of 2 mm and a length of 600 mm.

Figure 4:
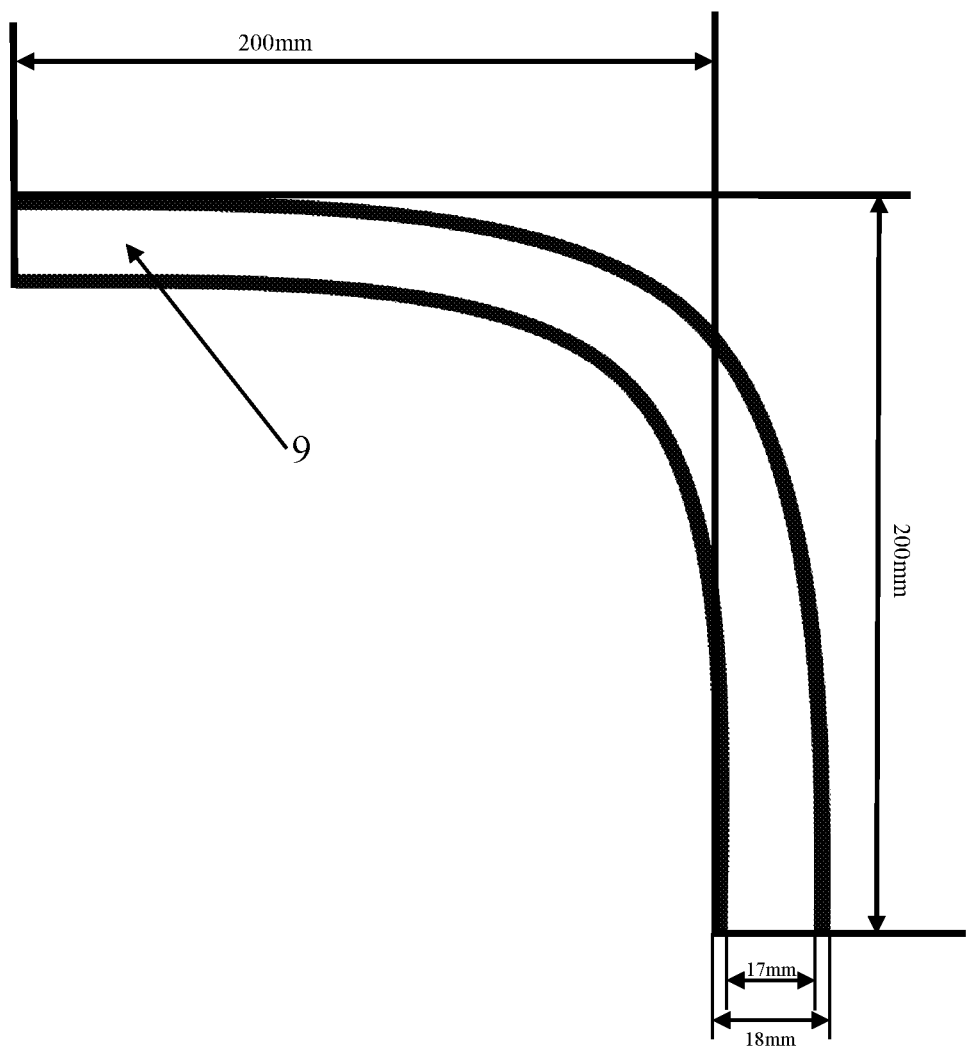
FIG. 4 is a plan view of a jig used for evaluation of bendability.
Figure 5:
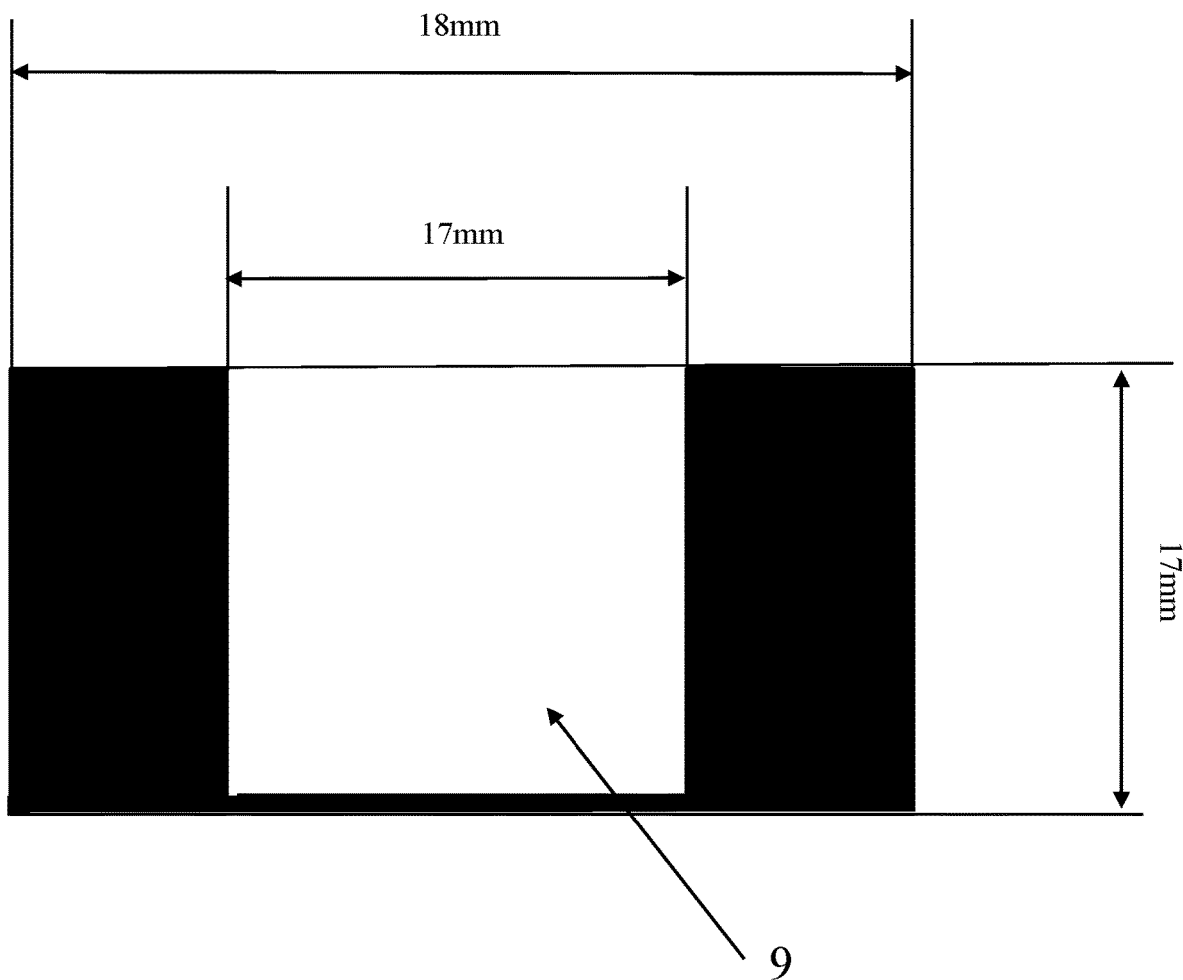
FIG. 5 is an enlarged partial sectional view of the jig depicted in FIG. 4.

(2) Availability of Bending Processing After Molding of Cylinder-Shaped Molded Article After preheating the obtained cylinder-shaped molded article at 260° C. for 2 hours, the bending processing was performed by fitting it into the jig 9 for bending processing shown in FIG. 4 and FIG. 5, so that the curvature radius was 55 mm and the angle was 90°. The result that could be fitted into the jig 9 was determined to be possible with bending processing and as rank "◯", and the result that could not be fitted was determined to be impossible with bending processing and as rank "x".

(3) Measurement of Wall Thicknesses Difference

Figure 6:
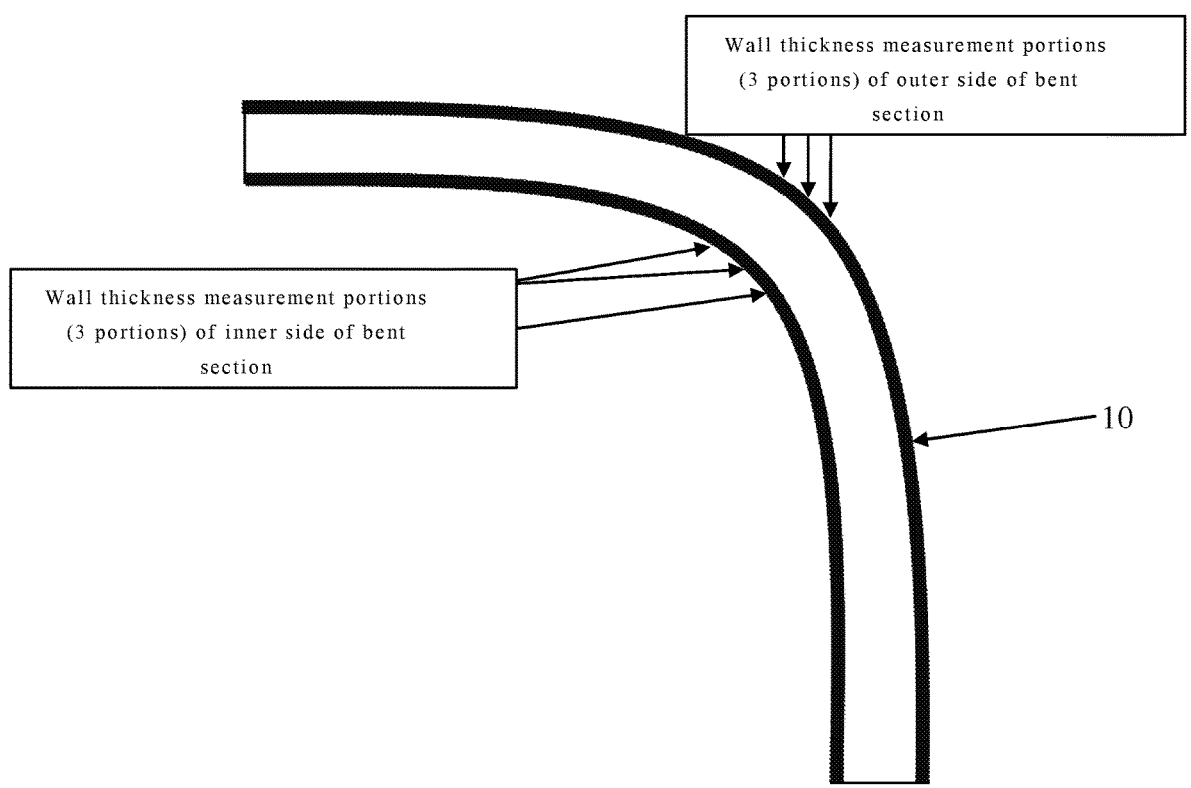
FIG. 6 is a schematic plan view of a cut cylindrical molded article showing portions of wall thickness measurement after bending.

As for a molded article which could be performed with bending processing, wall thickness change rate C (%) was determined. The wall thickness was determined by cutting the molded article performed with bending processing in half along its lengthwise direction (cut surface 10 of the cut cylinder-shaped molded article is shown in FIG. 6), and measuring the thickness of the cut surface as the wall thickness at the portions shown in FIG. 6. The wall thickness change rate of the wall thickness Bo of the portion of the outer side of the bent section relative to the wall thickness A, and the wall thickness change rate of the wall thickness Bi of the portion of the inner side of the bent section relative to the wall thickness A, were determined, respectively, and a greater one was defined as the wall thickness change rate C (%) of the bent section. For the wall thicknesses Bo and Bi, respective mean values of the wall thicknesses measured at respective three wall thickness measurement portions shown in FIG. 6 are used.

Take-Off Breaking Speed V at Being Molten and Melt Tension N at Breakage of Resin Composition Using "Capilograph" 1D supplied by Toyo Seiki Corporation, the PPS resin composition molten in a capillary at 320° C. with a capillary length of 40 (mm) and a capillary diameter of 1 (mm) was extruded into a form of a strand at a speed of 75 (mm/min) and taken off at an initial speed of 15 (mm/min) and an acceleration of 15 (mm/min$^2$) by a take-off roller through a pulley for tension measurement, and the take-off speed at the time when the strand was broken was determined as the "take-off breaking speed V (m/min) at being molten, and the tension detected by the pulley for tension measurement at that time was determined as the "melt tension N (mN) at breakage".

Flexural Modulus of Resin Composition

The flexural modulus of the resin composition was measured using 5566-type multipurpose tester supplied by Instron Corporation by the method based on ISO178. The size of the used test piece was 80±2.0 mm in length, 10±0.2 mm in width, and 4.0±0.2 mm in thickness. The measurement was performed at a test speed of 2 mm/min.

[Reference Example 1] Polymerization of PPS (PPS-1)

Into a 70-liter autoclave with a stirrer and a bottom stopper valve, charged were 8.27 kg (70.00 mol) of 47.5% sodium hydrosulfide, 2.94 kg (70.63 mol) of 96% sodium hydroxide, 11.45 kg (115.50 mol) of N-methyl-2-pyrrolidone (NMP), 1.89 kg (23.1 mol) of sodium acetate, and 5.50 kg of ion-exchanged water. The autoclave was gradually heated up to 245° C. for about 3 hours under atmospheric pressure while nitrogen was passed through, and after 9.77 kg of water and 0.28 kg of NMP were distilled out, the reaction vessel was cooled down to 200° C. The amount of residual water in the system per 1 mole of the charged alkali metal sulfide was 1.06 moles, including the water component consumed in the hydrolysis of NMP. Further, the dispersion amount of hydrogen sulfide was 0.02 mol per 1 mol of the charged alkali metal sulfide.

Thereafter, it was cooled to 200° C., 10.42 kg (70.86 mol) of p-dichlorobenzene and 9.37 kg (94.50 mol) of NMP were added, the reaction vessel was sealed under nitrogen gas atmosphere, and the temperature was elevated from 200° C. to 270° C. at a rate of 0.6° C./min while being stirred at 240 rpm, and the reaction was conducted at 270° C. for 140 minutes. Then, 2.40 kg (133 mol) of water was press fitted thereinto while being cooled from 270° C. to 250° C. for 15 minutes. Next, after being cooled gradually from 250° C. to 220° C. for 75 minutes, the contents were rapidly cooled down to near room temperature and taken out.

After diluting the contents with about 35 liters of NMP and stirring as a slurry at 85° C. for 30 minutes, the contents were filtered through an 80-mesh wire net (mesh opening: 0.175 mm) to obtain a solid substance. The obtained solid substance was similarly washed and filtered with about 35 liters of NMP. The obtained solid substance was diluted with 70 liters of ion-exchanged water, after being stirred at 70° C. for 30 minutes, it was filtrated through an 80-mesh wire net to collect the solid substance, and the operation was repeated three times in total. The obtained solid substance and 32 g of acetic acid were diluted with 70 liters of ion-exchanged water, after being stirred at 70° C. for 30 minutes, it was filtrated through an 80-mesh wire net, and further, the obtained solid substance was diluted with 70 liters of ion-exchanged water, after being stirred at 70° C. for 30 minutes, it was filtrated through an 80-mesh wire net to collect the solid substance. The solid substance thus obtained was dried under a nitrogen stream at 120° C. to obtain a dry PPS.

The obtained PPS had an MFR (melt flow rate) of 300 g/10 min. Where, the MFR is a value determined at a measurement temperature of 315.5° C. and a load of 5000 g by the method based on ASTM-D1238-70 method.

[Reference Example 2] Polymerization of PPS (PPS-2)

Into a 70-liter autoclave with a stirrer, charged were 8,267.37 g (70.00 mol) of 47.5% sodium hydrosulfide, 2,957.21 g (70.97 mol) of 96% sodium hydroxide, 11,434.50 g (115.50 mol) of N-methyl-2-pyrrolidone (NMP), 2,583.00 g (31.50 mol) of sodium acetate, and 10,500 g of ion-exchanged water. The autoclave was gradually heated up to 245° C. for about 3 hours under atmospheric pressure while nitrogen was passed through, and after 14,780.1 g of water and 280 g of NMP were distilled out, the reaction vessel was cooled down to 160° C. The amount of residual water in the system per 1 mole of the charged alkali metal sulfide was 1.06 moles, including the water component consumed in the hydrolysis of NMP. Further, the dispersion amount of hydrogen sulfide was 0.02 mol per 1 mol of the charged alkali metal sulfide.

Next, 10,235.46 g (69.63 mol) of p-dichlorobenzene and 9,009.00 g (91.00 mol) of NMP were added, the reaction vessel was sealed under nitrogen gas atmosphere, and the temperature was elevated to 238° C. at a rate of 0.6° C./min while being stirred at 240 rpm. After the reaction was conducted at 238° C. for 95 minutes, the temperature was elevated to 270° C. at a rate of 0.8° C./min. After the reaction was conducted at 270° C. for 100 minutes, while 1260 g (70 mol) of water was press fitted thereinto for 15 minutes, it was cooled down to 250° C. at a rate of 1.3° C./min. Thereafter, it was cooled down to 200° C. at a rate of 1.0° C./min, and then, rapidly cooled down to near room temperature.

The contents were taken out, after diluting the contents with 26,300 g of NMP, the solvent and the solid substance were separated by a filter (80 mesh), and the obtained particles were washed with 31,900 g of NMP and filtered. After this was washed several times with 56,000 g of ion-exchanged water and filtered, it was washed with 70,000 g of 0.05 wt % acetic acid aqueous solution, and filtered. After washing with 70,000 g of ion-exchanged water and filtering, the obtained PPS particles containing water was dried at 80° C. in hot air, and dried at 120° C. in vacuum. The MFR of the obtained PPS-2 was 100 g/10 min. The MFR was determined at the same conditions as those in PPS-1.

Raw Materials of Resin Compositions Used in Examples and Comparative Examples

The raw materials of the resin compositions used in Examples and Comparative Examples are as follows.
(a) PPS Resin
PPS-1: PPS resin polymerized as described in Reference Example 1
PPS-2: PPS resin polymerized as described in Reference Example 2
(b) Olefin Copolymer
b-1: Ethylene-glycidyl methacrylate-methyl acrylate copolymer (Sumitomo Chemical Co., Ltd., "Bondfast" E)
b-2: Ethylene-α-olefin copolymer (Mitsui Chemical Co., Ltd., "Tafmer" A4085S)
(c) Inorganic filler
Chopped strand (supplied by Nippon Electric Glass Co., Ltd., T-760H, length: 3 mm, Mean fiber diameter: 10.5 μm,)
(d) Other Additives
Silane coupling agent (supplied by Shinetsu Chemical Co., Ltd., KBM-303)

Production of PPS Resin Composition

Using a twin-screw extruder (supplied by Toshiba Machine Co., Ltd., TEM-26SS) with a 26 mm-diameter intermediate addition port set at a cylinder temperature of 320° C. and a screw rotational speed of 300 rpm, (a) PPS resin and (b) olefin copolymer were added from a raw material supply port at the weight ratio shown in Table 1 to be molten, and (c) inorganic filler was supplied at the intermediate addition port at the weight ratio shown in Table 1, and they were molten and kneaded at a discharge rate of 40 kg/hour to obtain resin composition pellets. Using the resin composition pellets, the take-off breaking speed V (m/min) at a state being molten and the melt tension N (mN) at breakage were determined by the above-described methods. The results are shown in Table 1.

Examples 1 to 4

Using the PPS resin composition pellets prepared with the composition shown in Table 1, molding was performed under the conditions described above using the aforementioned suction-type blow molding machine, and a pipe-shaped integrally molded article shown in FIG. 1A was produced. The evaluation results are shown in Table 1. In Examples 1 to 4, pipe-shaped integrally molded articles could be molded by optimizing the take-off breaking speed at a state being molten and the melt tension at breakage. From this result, using the PPS resin compositions described in Examples 1 to 4, it was confirmed that it was possible to obtain a desired long and small-diameter pipe-shaped integrally molded article by performing the suction-type blow molding method.

Examples 5 to 8

Using the PPS resin composition pellets prepared with the composition shown in Table 1, molding was performed under the conditions described above using the aforementioned suction-type blow molding machine, and a pipe-shaped integrally molded article shown in FIG. 1B was produced. The evaluation results are shown in Table 1. In Examples 5 to 8, pipe-shaped integrally molded articles could be molded by optimizing the take-off breaking speed at a state being molten and the melt tension at breakage. From this result, using the PPS resin compositions described in Examples 5 to 8, it was confirmed that it was possible to obtain a desired long and small-diameter pipe-shaped integrally molded article by performing the suction-type blow molding method.

Comparative Example 1

Using the PPS-resin compositions shown in Table 1, preparation of a pipe-shaped integrally molded article shown in FIG. 1A was attempted under the same conditions as those in Example 1. However, in the PPS resin composition of Comparative Example 1, the melt tension was insufficient, and a tear occurred during suction of the resin into the mold, and it was not possible to mold a pipe-shaped integrally molded article having a targeted shape.

Comparative Example 2

Using the PPS resin compositions shown in Table 1, preparation of a pipe-shaped integrally molded article shown in FIG. 1A was attempted under the same conditions as those in Example 1. However, in the PPS resin composition of Comparative Example 2, the melt tension was too high, the resin was hard to be elongated, the tip thereof was solidified during sucking it into the mold, and forming could not be achieved.

Comparative Example 3

Using the PPS resin composition shown in Table 1, the evaluation was performed according to the aforementioned "Evaluation of bending processability of cylinder-shaped molded article". As a result, although the bending processing could be performed, a large difference in wall thickness (a large wall thickness change rate C) occurred at the section performed with the bending processing, relative to the linear section.

Comparative Example 4

Using the PPS resin composition shown in Table 1, the same evaluation as that in Comparative Example 3 was performed. As a result, bending processing could not be performed.

TABLE 1

| | (a) PPS resin (parts by weight) | | (b) Polyolefin-based resin (parts by weight) | | (c) Inorganic filler (parts by weight) | (d) Other fillers (parts by weight) | Take-off breaking speed V (m/min) | Melt tension N (mN) | Flexural modulus (GPa) | Suction blow molding availability | | Evaluation of bending process-ability after molding | Wall thickness change rate C (%) |
|---|---|---|---|---|---|---|---|---|---|---|---|---|---|
| | PPS-1 | PPS-2 | b-1 | b-2 | | | | | | FIG.1A | FIG. 1B | | |
| Example 1 | 100 | — | 15.5 | 15.5 | 23 | — | 23 | 17 | 4.6 | ○ | — | — | 3.2 |
| Example 2 | 100 | — | 15.5 | 15.5 | 23 | 0.6 | 24 | 50 | 4.9 | ○ | — | — | 2.8 |
| Example 3 | — | 100 | 15.5 | 15.5 | 20 | — | 26 | 19 | 5.3 | ○ | — | — | 3.8 |
| Example 4 | 100 | — | 25 | 30 | 0 | — | 26 | 19 | 5.3 | ○ | — | — | 4.3 |
| Example 5 | 100 | — | 15.5 | 15.5 | 23 | — | 23 | 17 | 4.6 | — | ○ | — | 3.2 |
| Example 6 | 100 | — | 15.5 | 15.5 | 23 | 0.6 | 24 | 50 | 4.9 | — | ○ | — | 2.8 |
| Example 7 | — | 100 | 15.5 | 15.5 | 20 | — | 26 | 19 | 5.3 | — | ○ | — | 3.8 |
| Example 8 | 100 | — | 25 | 30 | 0 | — | 26 | 19 | 5.3 | — | ○ | — | 4.3 |
| Comparative Example 1 | 100 | — | 8 | 8 | 20 | — | 28 | 6 | 5.1 | x | — | — | — |
| Comparative Example 2 | 100 | — | 61 | 61 | 0 | — | 26 | 63 | 1.0 | x | — | — | — |

TABLE 1-continued

| | (a) PPS resin (parts by weight) | | (b) Polyolefin-based resin (parts by weight) | | (c) Inorganic filler (parts by weight) | (d) Other fillers (parts by weight) | Take-off breaking speed V (m/min) | Melt tension N (mN) | Flexural modulus (GPa) | Suction blow molding availability | | Evaluation of bending process-ability after molding | Wall thickness change rate C (%) |
|---|---|---|---|---|---|---|---|---|---|---|---|---|---|
| | PPS-1 | PPS-2 | b-1 | b-2 | | | | | | FIG.1A | FIG. 1B | | |
| Comparative Example 3 | 100 | — | 61 | 61 | 0 | — | 26 | 63 | 2.0 | — | — | ○ | 5.6 |
| Comparative Example 4 | 100 | — | 15.5 | 15.5 | 23 | — | 23 | 17 | 4.6 | — | — | x | — |

INDUSTRIAL APPLICABILITY

The pipe-shaped integrally molded article according to the present invention is applicable to pipe-shaped integrally molded articles of any field having at least one selected from a different-shape section, a bent section and a different-diameter section, and is particularly suitable as a pipe-shaped integrally molded article in transportation equipment such as automobiles, in which a limited space is required to be utilized efficiently.

EXPLANATION OF SYMBOLS

1: extruder
2: die head with accumulator
3: parison
4: air supply portion
5: upper shutter mechanism
6: mold
7: lower shutter mechanism
8: suction mechanism
9: jig for bending processing
10: cut surface of cut cylindrical molded article
20: parting line
100, 200: pipe-shaped integrally molded article
301, 302, 303, 304: different-diameter section
305: different-shape section

The invention claimed is:

1. A pipe-shaped integrally molded article, formed by molding a polyphenylene sulfide resin composition, and having, at one or more portions thereof, at least one selected from a different-shape section, a bent section and a different-diameter section, wherein
a total length L (mm) of the pipe-shaped integrally molded article is 1000 or more,
a ratio (L/D) of the total length L (mm) to an outer diameter D (mm) of the pipe-shaped integrally molded article is 20 or more,
a melt tension N (mN) at breakage of the polyphenylene sulfide resin composition is 10 or more and 50 or less,
the polyphenylene sulfide resin composition is compounded with (b) 5 to 100 parts by weight of a polyolefin-based resin and
(c) 10 to 45 parts by weight of an inorganic filler relative to
(a) 100 parts by weight of a polyphenylene sulfide resin, and
the (b) polyolefin-based resin is compounded with an olefin-based resin having an epoxy group and an ethylene•α-olefin-based copolymer at a ratio by weight of 45:55 to 50:50.

2. The pipe-shaped integrally molded article according to claim 1, wherein a take-off breaking speed V (m/min) of the polyphenylene sulfide resin composition at a state being molten is 20 or more.

3. The pipe-shaped integrally molded article according to claim 1, wherein, when a wall thickness of a straight cylinder section extending straightly in the pipe-shaped integrally molded article is referred to as A (mm), and a wall thickness of the different-shape section, the bent section or the different-diameter section is referred to as B (mm), a wall thickness change rate C, which is a rate of change of the wall thickness B to the wall thickness A, is within 15%.

4. The pipe-shaped integrally molded article according to claim 1, wherein the flexural modulus of the polyphenylene sulfide resin compositions is 0.1 GPa or more and 4.5 GPa or less.

5. A method for producing a pipe-shaped integrally molded article wherein the pipe-shaped integrally molded article according to claim 1 is molded within a single melt solidification cycle.

6. The method for producing a pipe-shaped integrally molded article according to claim 5, wherein
a mold having an opening at each of an upper end and a lower end is used,
a molten parison is supplied from the opening at the upper end of the mold, and
a blow molding is performed while the inside of the mold is sucked through the opening at the lower end of the mold.

* * * * *